United States Patent [19]

Woolley, Karen M. et al.

[11] Patent Number: 4,778,714

[45] Date of Patent: Oct. 18, 1988

[54] NONABRASIVE MAGNETIC RECORDING TAPE

[75] Inventors: Woolley, Karen M., Cottage Grove; Chong-Yong Kim, Shoreview; Arthur J. Ellsworth, South Saint Paul, all of Minn.

[73] Assignee: Minnesota Mining and Manufacturing Company, St. Paul, Minn.

[21] Appl. No.: 786,735

[22] Filed: Oct. 11, 1985

[51] Int. Cl.$^4$ .............................................. G11B 5/708
[52] U.S. Cl. .................................. 428/217; 252/62.54; 427/128; 427/131; 428/402; 428/323; 428/328; 428/329; 428/330; 428/331; 428/694; 428/695; 428/900
[58] Field of Search ................ 428/694, 329, 328, 323, 428/330, 331, 695, 900, 217, 402; 427/132, 131, 128; 252/62.54; 360/134–136

[56] References Cited

U.S. PATENT DOCUMENTS

| | | | |
|---|---|---|---|
| 3,630,910 | 12/1971 | Akashi et al. | 252/62.54 |
| 3,929,658 | 12/1975 | Beske | 252/62.54 |
| 4,275,115 | 6/1981 | Naruse | 428/329 |
| 4,399,189 | 8/1983 | Nakashima et al. | 428/328 |
| 4,420,408 | 12/1983 | Kajimoto et al. | 256/62.54 |

FOREIGN PATENT DOCUMENTS

| | | |
|---|---|---|
| 1804393 | 5/1970 | Fed. Rep. of Germany . |
| 1953459 | 6/1970 | Fed. Rep. of Germany . |

OTHER PUBLICATIONS

CRC Handbook of Chemistry and Physics, 56th edition, pp. B-197 to B-200, and F-22.

*Primary Examiner*—Ellis P. Robinson
*Attorney, Agent, or Firm*—Donald M. Sell; Warren R. Bovee

[57] ABSTRACT

Magnetic recording tape is suitable for data recording mechanisms equipped with brass or other soft heads when its magnetizable layer is based on ferromagnetic iron oxide particles and contains titanium dioxide or other soft head cleaning agent which has a hardness approximating or slightly exceeding that of the iron oxide. The magnetizable layer preferably is free from, but may also contain unusually small amounts of hard head cleaning agent such as alumina.

8 Claims, No Drawings

NONABRASIVE MAGNETIC RECORDING TAPE

FIELD OF THE INVENTION

The invention concerns magnetic recording tape, the recording layer of which comprises magnetic iron oxide particles in binder and is made for data recording.

BACKGROUND ART

Most magnetic recording tapes that employ magnetic iron oxide particles contain nonmagnetic particles which are harder than the iron oxide particles. The nonmagnetic particles both improve the wear resistance of the recording layers and also have a mildly abrasive action to scrub off any binder material which may be deposited on the recording and erase heads. Because of that scrubbing action, the nonmagnetic particles are often called "head cleaning agents", but some publications call them "abrasive powder" or "reinforcing agents" or simply "hard powder." In data recording tapes, the most commonly used head cleaning agent, alumina ($Al_2O_3$), is typically used in amounts from 2 to 10% by weight of the magnetic iron oxide particles.

Most data recording mechanisms employ ferrite heads which are quite resistant to abrasion. Even though magnetic recording tapes are drawn across the heads at high speeds up to about 500 cm per second, alumina particles in amounts within the above-mentioned range do not unduly abrade ferrite heads. That is, a ferrite head normally fails for other reasons before its gap is worn away by the abrasive action of the alumina. For example, a ferrite head may fail from work-hardening degradation or from gap erosion.

Far more economical than ferrite heads for data recording are soft heads, such as brass and "Mumetal" heads, but they would quickly be destroyed by conventional data recording tapes containing effective amounts of alumina. Accordingly, manufacturers of data recording mechanisms that employ soft heads suggest the use of data recording tapes that are less abrasive than those containing hard, nonmagnetic particles such as alumina and that instead users should be more conscientious about periodically cleaning the heads with a solvent that is specially designed to remove deposited binder. This puts an extra burden on users, and any lapse in periodic cleaning can result in lost or erroneous data.

Hence, there continues to be a need for a data recording tape that has good resistance to wear and will keep soft heads reasonably clean without undue wear.

Except as noted above, we have found nothing in the prior art about the problem preventing undue wear of soft data recording heads while also minimizing tape wear. On the other hand, we are aware of a great deal of prior art dealing with both head wear and tape wear in video recording. For example, U.S. Pat. No. 4,275,115 (Naruse) says that the addition of "hard powder to a magnetic recording composition . . . fails to improve the durability against the still picture reproduction and correct the tendency to the abrasion loss" (col. 1, lines 33–36). The Naruse patent's answer is to employ at least two types of nonmagnetic powders, one having a Mohs' hardness greater than 7 and the other a Mohs' hardness smaller than 7 but greater than about 3. Among powders listed as having a Mohs' hardness greater than 7 are "$Cr_2O_3$, alumina, silicon carbide, quartz, titanium oxide, zirconia and the like" (col. 2, lines 7–9).

U.S. Pat. No. 4,420,408 (Kajimoto et al.) also concerns video tape and the problem of improving its wear resistance to improve the still characteristic. The Kajimoto patent solves this problem by combining two kinds of fine "abrasive powders", both having a Mohs' hardness of at least 7, but having different true specific gravities differing by more than 1.0. Table 1 reports still reproducing times when employing equal parts of several pairs of powders, one pair being $TiO_2$ (true specific gravity 4.2) and $Cr_2O_3$ (true specific gravity 5.2).

European patent application No. 108,971 says that to enhance the still picture reproducing characteristics of video tape "it has heretofore been proposed to incorporate as a reinforcing agent a nonmagnetic powder material such as chromia ($Cr_2O_3$), alumina ($Al_2O_3$), or silicon carbide (SiC) into the magnetic layer. It is not easy, however, to disperse uniformly the above reinforcing agents in the magnetic layer, and there occurs non-uniformity of the dispersion, resulting in a decrease in wear resistance of the magnetic layer, the excessive wearing of the magnetic head, or a decrease in smoothness of the tape surface" (page 2, lines 5–15). The application is directed to a way of better dispersing the reinforcing agents which it also calls "abrasives", "nonmagnetic powder material", and "inorganic powder material". Useful inorganic powder materials are listed at page 4, lines 15–19 and include titanium dioxide ($TiO_2$) which also is used in Example 8 and 13.

U.S. Pat. No. 4,399,189 (Nakashima) concerns "two inconsistent requirements of an improvement of the wearing resistance of the magnetic tape for improving still characteristic and a reduction of the wearing of the head of the recorder" (col. 1, lines 32–39). It says that while $Cr_2O_3$ and $Al_2O_3$ powders improve the wearing resistance of magnetic recording tape, a wearing of the head is disadvantageously increased. Its solution to this problem is to employ in the magnetic layer both "a first non-magnetic powder of $Al_2O_3$ and/or $Cr_2O_3$ at a ratio of 0.5 to 15 weight % based on the magnetic powder and a second non-magnetic powder of $TiO_2$, SiC, $SiO_2$, $ZrO_2$ and/or $CeO_2$ at a ratio of 0.5 to 15 wt. % based on the magnetic powder and a total of the non-magnetic powder of less than 20 wt. % based on the magnetic powder. The average particle diameter of the first and second non-magnetic powder is in a range of 0.1 to 2 micrometers" (col. 1, lines 46–57). Although the patent has no working example, it gives the general formulation of tapes including both $TiO_2$ and $Al_2O_3$ powders at various ratios. Then in commenting on drawings generated from those tapes, it says: "When a ratio of $Al_2O_3$ powder was more than 3%, the still reproducing time was increased to be about 220 minutes. Moreover, if a ratio of $TiO_2$ powder was higher in said condition, the still reproducing time was further increased" (col. 3, lines 38–42).

U.S. Pat. No. 3,929,658 (Beske) concerns magnetic recording tapes using as the magnetic material $CrO_2$ which is quite hard and abrasive. Under "Background of the Invention", the Beske patent points out that magnetic recording tapes cause undue head wear and mentions two prior approaches to improving head life. One approach uses lubricants and the other uses "very hard particles that are even more abrasive than the ferromagnetic particles, such as flint, garnet, silicon carbide, as described, for example, in U.S. Pat. No. 3,630,910 and in German Pat. Nos. 1,804,393 and 1,953,459" (col. 1, lines 46–50). The Beske patent instead improves head life by employing "about 2 to about 20 percent, based on the weight of the ferromagnetic particles, of finely divided particles of at least one nonferromagnetic metal oxide having a hardness of 5.5 or less on the Moh scale" (col. 1, lines 59-63). "Particularly preferred materials are anatase titanium dioxide (Moh hardness=5.5) and molybdenum trioxide (Moh hardness=2.0)" (col. 3, lines 33-36). While the patent does not say so, it appears that the titanium dioxide and other nonferromagnetic particles are being used to offset the overly abrasive nature of the ferromagnetic $CrO_2$.

Although none of the above-discussed publications specifically concerns data recording or problems arising out of the use of soft heads, each may have some pertinence to the present invention because of the use of titanium dioxide in the magnetizable layer.

HARDNESS VALUES

Because Mohs' hardness values are rather indefinite, hardness values are here reported in the Knoops scale. With either scale, the hardness of a powder can only be estimated from the hardness of a crystal of the same material, and there can be no assurance that the hardness remains the same after the crystal has been ground into a fine powder. Furthermore, various forms of the same chemical compound may have significantly different hardnesses. In the above citations, the Mohs' hardness of $TiO_2$ is given both as 7.0 (Naruse and Kajimoto) and as 5.5 (Beske). The CRC Handbook of Chemistry and Physics, 56th addition, at pages B-197 to B-200, reports Mohs' hardnesses for various crystalline forms of $TiO_2$ to be: anatase 5.5-6.0, brookite 5.5-6.0, and rutile 6.0-6.5. We have made no effort to measure hardnesses and simply repeat reported Knoops hardnesses for a number of nonmagnetic materials as follows:

| | |
|---|---|
| $Al_2O_3$ | 2100 |
| $Cr_2O_3$ | 1800-3000 |
| SiC | 2480 |
| $ZrO_2$ | 1160 |
| $TiO_2$ | 700 |

All of the magnetic recording tapes we have studied use one of the first two of this list as head cleaning agents, and SiC reportedly is sometimes used. Because of their hardness, we here call them "hard head cleaning agents" and use that term to indicate a nonmagnetic powder having a Knoops hardness greater than 1200.

The CRC Handbook at page F-22 compares Knoops and Mohs' hardness values for various materials.

DISCLOSURE OF INVENTION

The invention provides magnetic recording tapes having a magnetizable layer comprising ferromagnetic iron oxide particles dispersed in binder, which tape can be used on data recording mechanisms that have soft heads and can keep those heads reasonably clean without undue wear. The novel magnetic recording tape achieves this by including in its recording layer, based on the weight of the iron oxide particle, from 0.5 to 3% of titanium dioxide or other nonmagnetic powder having a Knoops hardness from 600 to 1200 (preferably less than 800) while restricting the amount of any hard head cleaning agent to less than 1.0%. We here use the term "soft head cleaning agent" for nonmagnetic powder having a knoop hardness from 600 to 1200.

It is surprising that titanium dioxide could have this extraordinary effect, considering that its hardness may approximate or only slightly exceed that of ferromagnetic iron oxide particles. Although no report of Knoops hardness values for ferromagnetic iron oxides has been found, the aforementioned CRC Handbook reports Mohs' hardness of 5-6 for $Fe_2O_3$ (hematite) and 5.5-6.5 for $Fe_3O_4$ (magnetite).

Even though soft head cleaning agents such as titanium dioxide have been used in magnetizable layers for reasons such as we discussed in citations of the above "Background Art" section, it is our understanding that they have been used only to modify the abrasivity of other ingredients, e.g., the abrasivity of $Al_2O_3$ or $CrO_2$. We do not find in those citations any suggestion of using as head cleaning agents titanium dioxide (or other powders we here call "soft head cleaning agents").

Preferably, the amount of soft head cleaning agent does not exceed 1.5%, because larger amounts have shown no advantage and would limit the amount of the ferromagnetic iron oxide particles, hence limiting signal output. On the other hand, it occasionally may be desirable to limit signal output.

In the magnetizable layer of any magnetic recording tape of the invention, the soft head cleaning agent and any hard head cleaning agent should be substantially free from particles exceeding 2 micrometers in diameter. Larger particles could scratch the heads, and also create head-to-tape spacing losses. It is preferred that the average diameter of the soft head cleaning agent be from 0.2 to 1.0 micrometer and that of any hard head cleaning agent be from 0.2 to 0.5 micrometer. Best results to date have been achieved when the amount of soft head cleaning agent exceeds that of any hard head cleaning agent. Preferably, the recording layer is free from hard head cleaning agent.

In the following examples, all parts are by weight.

EXAMPLE 1

The backing of this tape of this example was biaxially oriented poly(ethylene terephthalate) film having a thickness of about 1.0 micrometer. A nonmagnetic coating had been applied to the backside of the film to provide a degree of roughness and electrical conductivity, after which a magnetizable layer was applied to the faceside using the following dispersions.

| | Parts |
|---|---|
| Dispersion I | |
| Titanium dioxide (average diameter of 0.7 micrometer) | 45.6 |
| Dispersant | 0.8 |
| Polyurethane elastomer | 3.6 |
| Tetrahydrofuran solvent | 50.0 |
| Dispersion II | |
| Iron oxide (cobalt-modified gamma-$Fe_2O_3$ particles having an aspect ratio of about 2.6:1 and an average length of about .23 micrometer) | 70.8 |
| Dispersant | 3.3 |
| Thermoplastic copolymer of equivalent amounts of bisphenol A and epichlorohydrin ("PKHH", Union Carbide) | 6.9 |
| Polyurethane elastomer | 10.3 |
| Carbon black | 6.4 |
| Lubricant | 1.8 |
| Toluene | 4.5 |
| Methyl ethyl ketone | 16.6 |
| Tetrahydrofuran | 241.5 |

Dispersion I was milled for 24 hours in a jar mill with ceramic media Dispersion II was made by milling until smooth in a vertical sandmill and then mixed with a high speed mixer to which sufficient Dispersion I was added so that the final mixture had 1.5% titanium dioxide based on the iron oxide particles. Immediately after adding isocyanate crosslinking agent, the combined dispersion was coated onto the backing and heated to drive off the solvent, providing a dry-coating caliper of about 2 micrometers. This was then calendered, yielding a final magnetizable coating caliper of about 1.75 micrometers. The resulting tape was slit to ¼ inch (0.635 cm), and 183 m was loaded into a belt-driven data cartridge of the type disclosed in U.S. Pat. No. 3,692,255.

EXAMPLE 2 AND COMPARATIVE EXAMPLES A, B AND C

Tapes were made and loaded into cartridges as in Example 1 except substituting for the titanium dioxide the same amount of other nonmagnetic powders as follows:

| Example | Nonmagnetic powder | Average particle size (micrometers) |
|---|---|---|
| 2 | ZrO$_2$ | 0.4 |
| A | Al$_2$O$_3$ | 0.3 |
| B | Cr$_2$O$_3$ | 0.6 |
| C | SiC | 0.4 |

Each cartridge was driven in a DCD-3 drive (Minnesota Mining and Manufacturing Company) across a brass head at a speed of 90 inches per second (229 cm/sec). After 2500 cycles, measurements were made of the physical wear profile of the brass head. Also, the head was examined visually for deposited debris. A rating from 1 to 10 was awarded, 1 indicating substantially no deposit and 10 indicating a large deposit. Results were:

| Example | Head wear (micrometers) | Deposit Rating |
|---|---|---|
| 1 | 6.4 | 2 |
| 2 | 3.9 | 4 |
| A | 8.5 | 4 |
| B | 64.2 | 6 |
| C | 99.6 | 7 |

A deposit rating of 4 or less is considered to be satisfactory, a rating from 5 to 6 is considered marginal, and a rating of 7 or higher is considered to be unsatisfactory. The fact that comparison tapes B and C left greater deposit than those of Examples 1 and 2 is attributed to debris generated in the excessive wearing of the head.

EXAMPLES 3-6 AND COMPARATIVE TAPES D-H

A series of tapes were made substantially as in Example 1 except employing the following dispersions and various amounts of the titanium dioxide.

| | Parts |
|---|---|
| Dispersion III | |
| Titanium dioxide (average diameter of 0.7 micrometer) | 49.0 |
| Dispersant | 1.0 |
| Tetrahydrofuran solvent | 50.0 |
| Dispersion IV | |

-continued

| | Parts |
|---|---|
| Iron oxide (cobalt-modified gamma-Fe$_2$O$_3$ particles having an aspect ratio of about 20:1 and an average length of about 1.0 micrometer) | 79.0 |
| Dispersant | 5.1 |
| Vinyl chloride/vinyl acetate copolymer ("VAGH", Union Carbide) | 7.2 |
| Polyurethane elastomer | 4.7 |
| Carbon black | 4.0 |
| Lubricant | 1.4 |
| Tetrahydrofuran | 270 |

For comparison, a series of tapes were made using Al$_2$O$_3$ powder (average diameter 0.5 micrometer) instead of the titanium dioxide.

Each of the tapes was loaded into a belt-driven data cartridge and tested as above.

| Example | Amount (%) of TiO$_2$ | Amount (%) of Al$_2$O$_3$ | Head Wear (micrometers) | Deposit Rating |
|---|---|---|---|---|
| 3 | 0.5 | 0 | 0.5 | 4 |
| 4 | 1.0 | 0 | 0.6 | 4 |
| 5 | 1.5 | 0 | 3.3 | 3 |
| 6 | 2.0 | 0 | 2.1 | 4 |
| D | 0 | 0.5 | 2.8 | 5 |
| E | 0 | 1.0 | 3.4 | 4 |
| F | 0 | 1.5 | 7.8 | 4 |
| G | 0 | 2.0 | 5.5 | 5 |
| H | 0 | 0 | 0.9 | 8 |

EXAMPLES 7-9 AND COMPARATIVE TAPES I-K

A series of tapes were made substantially as in Examples 3-6 and Comparative Tapes D-H except employing the following iron oxide dispersion:

| | Parts |
|---|---|
| Dispersion V | |
| Iron oxide (unmodified gamma-Fe$_2$O$_3$ particles having an aspect ratio of about 5:1 and an average length of about 0.2 micrometer) | 70.0 |
| Dispersant | 4.2 |
| Vinyl chloride/vinyl acetate copolymer ("VAGH", Union Carbide) | 15.4 |
| Polyurethane elastomer | 5.1 |
| Carbon black | 3.5 |
| Lubricant | 1.8 |
| Tetrahydrofuran | 284.6 |

The tapes were loaded into cartridges and tested as above.

| Example | Amount (%) of TiO$_2$ | Amount (%) of Al$_2$O$_3$ | Amount (%) of Cr$_2$O$_3$ | Head Wear (micrometers) | Deposit Rating |
|---|---|---|---|---|---|
| 7 | 0.5 | 0 | 0 | 11 | 5 |
| 8 | 1.0 | 0 | 0 | 5 | 4 |
| 9 | 1.5 | 0 | 0 | 12 | 4 |
| I | 0 | 0 | 0.5 | 30 | 5 |
| J | 0 | 1.0 | 0 | 11.5 | 5 |
| K | 0 | 1.5 | 0 | 22 | 3 |

The examples demonstrate that by substituting titanium dioxide powder for a conventional head cleaning agent, a data recording tape keeps a brass or other soft head reasonably clean without undue head wear.

I claim:

1. Magnetic recording tape suitable for data recording mechanisms equipped with soft heads, said tape having a magnetizable layer comprising ferromagnetic iron oxide particles dispersed in binder, which layer includes, based on the weight of the iron oxide particles, from 0.5 to 3.0% of soft head cleaning agent having a Knoop hardness of from 600 to 1200 while being substantially free from any hard head cleaning agent, and wherein any head cleaning agent is substantially free from particles exceeding 2 micrometers in diameter and the hardness of said ferromagnetic iron oxide particles is approximately the same as or slightly less than the hardness of said soft head cleaning agent.

2. Magnetic recording tape as defined in claim 1 wherein the Knoops hardness of the soft head cleaning agent is less than 800.

3. Magnetic recording tape as defined in claim 2 wherein the soft head cleaning agent is titanium dioxide.

4. A data recording mechanism equipped with a soft head and a magnetic recording tape as defined in claim 2.

5. A belt-driven data cartridge loaded with a magnetic recording tape as defined in claim 2.

6. Method of making a magnetic recording tape which is suitable for data recording mechanisms equipped with soft heads, said method comprising the steps of dispersing into a binder ferromagnetic iron oxide particles and from 0.5 to 3% by weight of soft head cleaning agent having a Knoop hardness of between 600 and 1200 while keeping the dispersion substantially free from any hard head cleaning agent wherein the hardness of said ferromagnetic iron oxide particles is approximately the same as or slightly less than the hardness of said soft head cleaning agent and coating the dispersion onto a nonmagnetic backing.

7. Method as defined in claim 6 wherein the Knoops hardness of the soft head cleaning agent is less than 800.

8. Method as defined in claim 7 wherein the soft head cleaning agent is titanium dioxide.

* * * * *